United States Patent [19]

Igarashi

[11] Patent Number: 4,955,417
[45] Date of Patent: Sep. 11, 1990

[54] LOW PRESSURE TIRE

[75] Inventor: Yasuo Igarashi, Kawanishi, Japan
[73] Assignee: Sumitomo Rubber Industries, Ltd., Hyogo, Japan
[21] Appl. No.: 210,413
[22] Filed: Jun. 21, 1988

[30] Foreign Application Priority Data

Jun. 23, 1987 [JP] Japan .................. 62-156988

[51] Int. Cl.$^5$ .............................. B60C 3/00
[52] U.S. Cl. ...................... 152/454; 152/209 R
[58] Field of Search .......... 152/209 R, 209 A, 209 D, 152/454

[56] References Cited

FOREIGN PATENT DOCUMENTS 2362627  6/1975  Fed. Rep. of Germany ... 152/209 R
144109  9/1982  Japan .......................... 152/209 R
60-234008 11/1985 Japan .

Primary Examiner—Michael W. Ball
Assistant Examiner—Geoffrey L. Knable

[57] ABSTRACT

A low pressure tire, comprises: a tire main body made of rubber, a pair of bead cores disposed in bead portions of the tire main body, and a rubber tread on a crown part of the tire main body. The maximum rubber thickness of the tire main body between a tread edge and a maximum tire width point is 1.3 to 3.5 times the rubber thickness at the tread edge, and further the maximum rubber thickness is 1.1 to 2.5 time the rubber thickness at the maximum tire width point, whereby weight reduction of tire is achieved while maintaining or improving the shock absorbing and damping characteristics of the tire.

2 Claims, 2 Drawing Sheets

LOW PRESSURE TIRE

BACKGROUND OF THE INVENTION

The present invention relates to a low air pressure tire for all terrain vehicles, in which weight reduction is achieved with maintaining or improving its shock absorbing and damping characteristics.

In general, tires for all terrain vehicles (the so called ATV) for running on all terrain like gravel roads, sandy roads, muddy roads and rough roads, are required to have a good shock absorbing characteristic and a good vibration damping characteristic because shocks during running are especially hard.

In addition, such a kind of vehicle is often equipped with no suspension mechanism.

It is therefore, necessary for the tire itself to have functions of both suspension mechanism and shock absorber.

For that, there was proposed for example Japanese Patent Applicaiton laid open No.60-234008, wherein to absorb and alleviate shocks, the longitudinal spring coefficient of the tire is lowered by selecting the rubber thickness of a sub-tread part of the tire body under tread grooves, the angle of carcass cords and the material of the carcass cords, which all have much effect on the above-mentioned characteristics. The tire comprises a tire main body of which the rigidity is gradually increased toward tire bead parts from a tire crown part and a tread rubber disposed on the crown part.

Although this tire has functions of absorbing and alleviating shocks, the rubber thickness is increased from the crown part to the bead part causing an increase in tire weight.

SUMMARY OF THE INVENTION

It therefore, an object of the present invention to provide a low air pressure tire in which shocks are well absorbed and alleviated while achieving weight reduction of the tire.

According to one aspect of the present invention, the low pressure tire, comprises: a tire main body made of rubber; a pair of bead cores disposed in bead portions of the tire main body; and a rubber tread on a crown part of the tire main body, and the maximum rubber thickness of the tire main body between a tread edge and a maximum tire width point is 1.3 to 3.5 times the rubber thickness at the tread edge, and further the maximum rubber thickness is 1.1 to 2.5 times the rubber thickness at the maximum tire width point.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

An embodiment of the present invention will now be described in detail with reference to the accompanying drawings.

The tire T comprises a tire main body 1 and a rubber 2.

The tire main body 1 is usually made of natural rubber tread, synthetic rubber or the like, but many kinds of elastomer such as polyurethane rubber may be used.

The tire main body has a pair of bead portions, a crown portion and a pair of sidewall portions therebetween. The bead portions are provided with bead cores 3, respectively.

Figure 1:
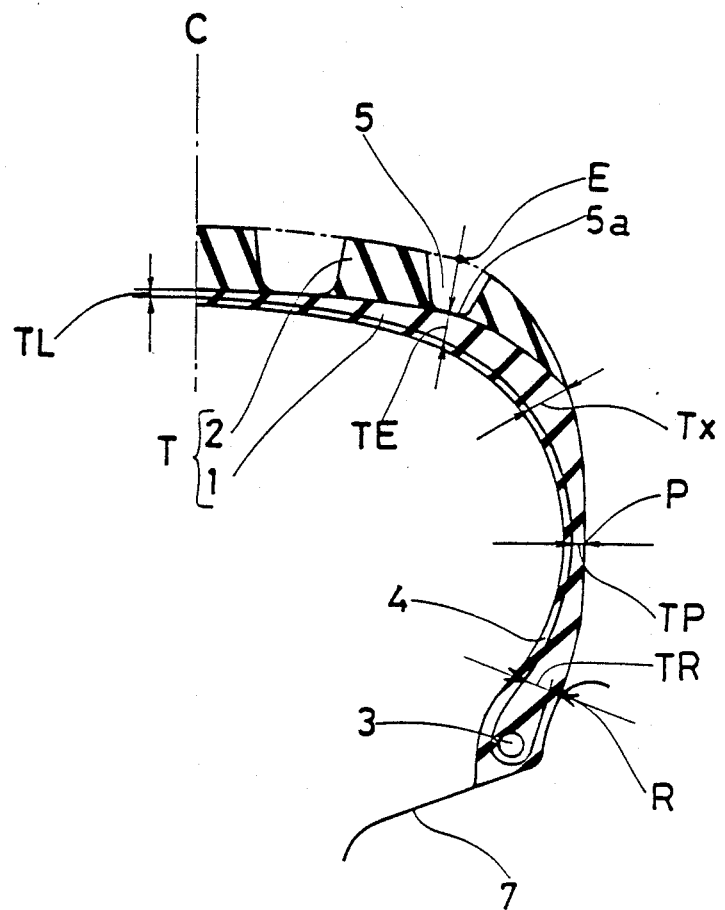
FIG. 1 is a cross sectional view showing the right half section of a tire according to the invention.

In the embodiment of FIG. 1, at least one ply of reinforcement cords is provided on the inner surface of the tire main body 1 as a carcass 4, and both edges thereof are turned up around the bead cores 3 from the inside towards the outside of the tire.

In this invention, the rubber thickness of the tire main body is defined as follows: Basically the rubber thickness is defined as a distance between the outer surface and the inner surface of the tire main body along a line normal to the inner surface. Therefore, in the case that a carcass is provided, it is defined as a distance from the outer surface of the tire main body to the carcass. However, in the region in which the tread rubber is disposed, the rubber thickness is defined as a distance from the level of the groove base 5a of the tread grooves 5 to the inner surface (the carcass). Such a thickness is usually called a sub-tread gauge, and rubber under the above-mentioned groove base level is called sub-tread.

Furthermore, in this invention, the tread edges E are defined as edges of the ground contacting region under such a condition that the tire is fitted to the vehicle and inflated to the standard inner pressure.

The rubber thickness of the tire main body becomes maximum (Tx) at respective portions in the shoulder portion of the tire or the vicinity thereof between the tread edge E and the maximum tire width point P where the width of the tire becomes maximum, and from each of the above-mentioned maximum thickness portions the rubber thickness decreases gradually toward both the tire equator C (Rubber thickness TL) and the maximum tire width section or point P (Rubber thickness TP).

The maximum rubber thickness Tx is in a range of 4 to 9 mm and further it is 1.3 to 3.5 times the rubber thickness TE (sub-tread gauge) of the tire main body at the tread edge E, which thickness is defined as a distance along a line normal to the inner surface passing through the tread edge E. When the thickness Tx is under 1.3 times TE, a shock absorbing effect is not sufficient, and a damping effect becomes poor. As a result, the bumping of the vehicle is apt to be kept undamped, and the performance a rough road becomes very poor. When Tx is over 3.5 times TE, the damping performance becomes good, but the tire weight is increased and shock absorbing becomes poor.

The rubber thickness Tx is in a range of 1.1 to 2.5 times the rubber thickness TP at the maximum tire width point P.

Furthermore, the rubber thickness gradually increases toward the bead portion from the maximum tire width point P to the upper edge R of the region in which the tire contacts with a rim 7.

The rubber thickness TR at the above-mentioned upper edge R is 2.5 to 3.5 times the rubber thickness TP at the maximum tire width point P to increases the lateral stiffness of the bead part, whereby the durability of the bead part during running on the rough roads with a low inner pressure, is improved. If the rubber thickness TR is over 3.5 times, it is not good from the point of view of durability and weight.

In addition to the above-mentioned bead cores and carcass, the tire main body of the invention can be provided with further reinforcement such as bead reinforcing layers, bead apex rubber.

That is, in order to further increase the lateral stiffness of the bead parts to improve or maintain the steering stability, each bead part is preferably provided with one or more fiber cord reinforcement layers extending toward the sidewall part from the bead part.

However, the tire main body of the invention can be constituted as the so-called cordless tire without any reinforcing materials.

On the other hand, there are different methods of manufacturing the tire of the present invention. A typical one is to dispose a rubber tread on a tire main body formed separately from the rubber tread and after that to unite them into one body. Another method is an injection moulding to form a tire main body and a rubber tread at the same time into one body, which method is preferably employed in the case of a cordless tire.

Figure 2:
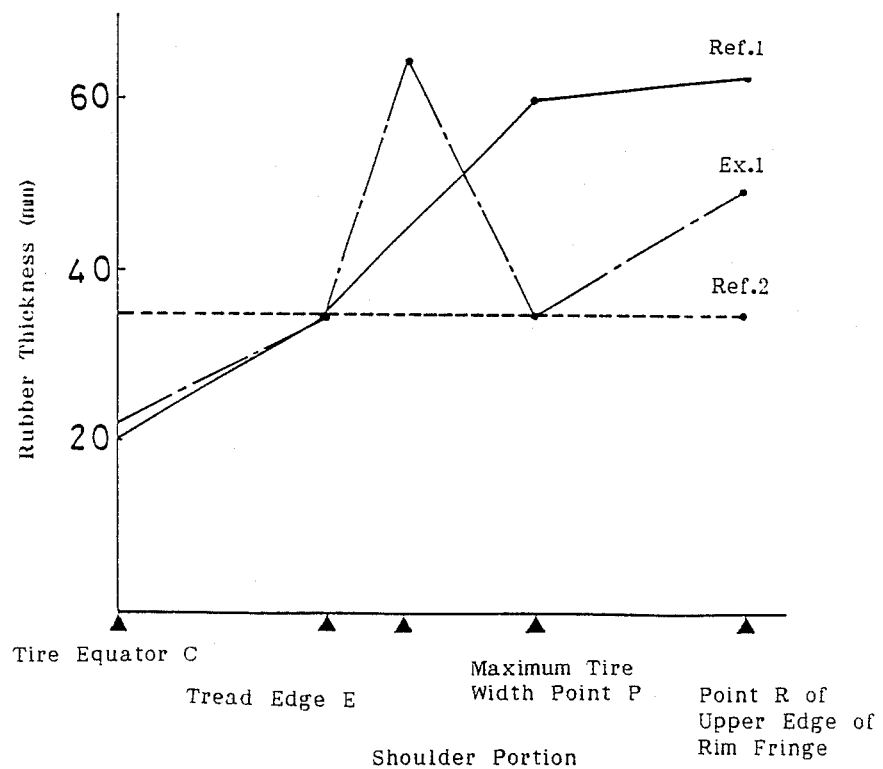
FIG. 2 is a graph showing rubber thickness distributions of the tire main body thereof and tire main bodies of two references.

As test tires, many kinds of ATV tires of 22×11.0-8 in size were manufactured by way of trail, which tires are a cross ply construction (2 carcass plies of nylon cords) and a cross-sectional structure shown in FIG. 1, and their respective specifications are set out on Table 1. The distribution of the rubber thickness of the tire main body of some of them are shown in FIG. 2, wherein:

the rubber thickness in the reference tire 1 gradually increases from the tire equator to each bead part;

the rubber thickness in the reference tire 2 is almost constant from the tire equator to each bead part; and the rubber thickness in the example 1 of the invention gradually decrease from each shoulder part towards the tire equator and towards the respective maximum tire width point.

The damping effects of the test tires were evaluated by a feeling test method using an actual ATV, and the results are shown in Table 1.

TABLE 1

| Tire | Ref. 1 | Ref. 2 | Ref. 3 | Ref. 4 | Ref. 5 | Ref. 6 | Ex. 1 | Ex. 2 | Ex. 3 |
|---|---|---|---|---|---|---|---|---|---|
| Rubber thickness | | | | | | | | | |
| TE (mm) | 3.5 | 3.5 | 3.5 | 2.0 | 2.0 | 2.0 | 3.5 | 2.0 | 3.0 |
| Tx (mm) | 6.0 | 3.5 | 4.2 | 8.0 | 5.0 | 5.0 | 6.0 | 5.0 | 8.0 |
| TP (mm) | 6.0 | 3.5 | 3.5 | 3.5 | 3.0 | 3.0 | 3.5 | 3.0 | 5.0 |
| TR/TP (ratio) | 2.0 | 2.0 | 2.0 | 2.0 | 2.5 | 3.8 | 3.0 | 3.0 | 3.5 |
| Tire weight (Index) | 100 6.65 kg | 82 | 88 | 95 | 88 | 90 | 90 | 86 | 105 |
| Damping factor *1 (Index) | 100 | 70 | 98 | 98 | 98 | 98 | 95 | 98 | 98 |
| Shock absorbing *2 effect | 3.5 | 3 | 2 | 3 | 4 | 4 | 4 | 4 | 3.5 |
| Durability *3 (Index) | 100 | 100 | 100 | 100 | 110 | 95 | 120 | 120 | 120 |

*1 The damping factors were measured with an accelerometer attached to the tire axle when the tire was dropped from the level of 20 mm with a tire load of 65 kg and a air pressure of 1.5 kg/sq.cm. The factors are indicated using an index based on the assumption that the result for the reference tire 1 is 100. The larger the value is, the better the performance is.
*2 The shock absorbing effect was evaluated by a five point method in a feeling test by a test driver using an actual ATV. The larger the value is, the better the performance is, and under 3 points means insufficient.
*3 The durability means a running time until damage occurred. A drum tester was used, and the tire load was 160 kg and the inner air pressure is 0.2 kg/sq.cm. The durability was indicated using an index based on the assumption that the running time of the reference tire 1 is 100. The larger the value is, the better the durability is.

As explained above, according to the invention, the rubber thickness becomes maximum in the shoulder parts, and the crown part and the sidewall parts become thin. Therefore, little shocks are effectively absorbed by the supple crown part and the sidewall parts having a small longitudinal spring constant.

Owing to the increased rubber thickness in the shoulder parts, the deformation thereof during running is lessened, but an internal energy loss is increased with generating heat, whereby those parts effectively function as a good shock absorber.

Especially, for the tires used for motocross competitions under a comparatively low inner pressure, the Tx parts exhibit a good effect on the shock absorbing characteristic thereof. Also, the rebound response of the prior art tires like a rubber ball is effectively removed, and the damping effect is improved. A good ride and safety in running are accordingly obtained.

Furthermore, in both the crown part and the sidewall parts, the rubber thickness is small. Accordingly, the tire weight is reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A low presure tire comprising:
   a rubber main body comprising a pair of bead portions having a bead core, a crown portion and a pair of sidewall portions extending therebetween;
   a rubber tread disposed on the crown portion of the rubber main body, said rubber tread having tread grooves; and
   a carcass of cords provided on an inner surface of the rubber main body and extending between the bead portions,
   thickness of rubber in the tire being defined as a distance from the carcass ply to a level of the tread groove bottom in a range in which said rubber tread is disposed on the rubber main body and defined, in the remaining range, as a distance from the carcass ply to the outer surface of the main body, the thickness being a maximum of 4 to 9 mm at a point between a tread edge and a maximum tire width section, the rubber thickness being gradually decreased from the maximum rubber thickness points toward the tire equator and towards the respective maximum tire width section, the rubber thickness at the tread edge being 1/1.3 to 1/3.5 times the maximum rubber thickness, the rubber thickness at the maximum tire width section being 1/1.1 to 1/2.5 times the maximum rubber thickness.

2. The low pressure tire as recited in claim 1, wherein the rubber thickness is gradually increased towards the bead portions from the maximum tire width section.

* * * * *